(12) United States Patent
Jackson, Jr.

(10) Patent No.: US 9,590,403 B2
(45) Date of Patent: Mar. 7, 2017

(54) WIRE MANAGEMENT SYSTEM

(71) Applicant: Nicholas Jackson, Jr., Davisburg, MI (US)

(72) Inventor: Nicholas Jackson, Jr., Davisburg, MI (US)

(73) Assignee: A. RAYMOND ET CIE, Grenoble (FR)

( * ) Notice: Subject to any disclaimer, the term of this patent is extended or adjusted under 35 U.S.C. 154(b) by 354 days.

(21) Appl. No.: 13/750,362

(22) Filed: Jan. 25, 2013

(65) Prior Publication Data

US 2014/0209764 A1    Jul. 31, 2014

(51) Int. Cl.
| | | |
|---|---|---|
| *H02G 3/34* | (2006.01) | |
| *H02G 3/04* | (2006.01) | |
| *H02G 3/32* | (2006.01) | |

(52) U.S. Cl.
CPC ............. *H02G 3/34* (2013.01); *H02G 3/0406* (2013.01); *H02G 3/0431* (2013.01); *H02G 3/32* (2013.01)

(58) Field of Classification Search
CPC ................................ H02G 3/34; H02G 3/0406
USPC ............................. 248/68.1; 174/72 A, 72 R
See application file for complete search history.

(56) References Cited

U.S. PATENT DOCUMENTS

| | | | |
|---|---|---|---|
| 2,921,607 A | | 1/1960 | Caveney |
| 3,312,251 A | | 4/1967 | Marks et al. |
| 3,363,050 A | * | 1/1968 | Martin ........................ 174/101 |
| 3,636,984 A | * | 1/1972 | Rauhauser .................. 138/155 |
| 3,881,520 A | | 5/1975 | Murphy |
| 4,077,434 A | * | 3/1978 | Sieckert et al. ................ 138/92 |
| 4,194,711 A | * | 3/1980 | Winton ........................... 248/49 |
| 4,484,020 A | * | 11/1984 | Loof ..................... H02G 3/045 138/168 |
| 4,496,100 A | * | 1/1985 | Schwager et al. .......... 238/10 R |
| 4,544,094 A | * | 10/1985 | Scholey ....................... 238/10 R |
| 4,712,755 A | * | 12/1987 | Robbins et al. ................ 248/49 |
| 4,765,577 A | * | 8/1988 | Collins et al. ................. 248/59 |
| 4,864,082 A | * | 9/1989 | Ono et al. ....................... 174/97 |
| 5,024,251 A | * | 6/1991 | Chapman ............... H01R 4/304 138/155 |
| 5,235,136 A | * | 8/1993 | Santucci ................ H02G 3/266 174/101 |
| 5,257,768 A | * | 11/1993 | Juenemann ........... F16L 55/035 248/604 |
| 5,301,917 A | * | 4/1994 | Dyer ......................... F16L 3/23 248/68.1 |

(Continued)

FOREIGN PATENT DOCUMENTS

| | | | | |
|---|---|---|---|---|
| DE | EP 0505748 A1 | * | 9/1992 | ............. F16L 3/006 |
| DE | EP 0505748 B1 | * | 4/1995 | ............. F16L 3/006 |

(Continued)

OTHER PUBLICATIONS

Takahiko Sonoda, Machine translations of JP2008271672 A, Wiring Harness Protector, Nov. 6, 2008, Bibliography, Description, Claims and Drawings.*

*Primary Examiner* — Joshua J Michener
*Assistant Examiner* — Chiedu Chibogu
(74) *Attorney, Agent, or Firm* — Dickinson Wright PLLC

(57) ABSTRACT

A wire management system and, more particularly, a wire management system including at least one wire track unit having mount rotatably positioned on the wire track unit along with an integrally formed tension tab for holding wires in the wire track assembly during use.

7 Claims, 7 Drawing Sheets

(56) References Cited

U.S. PATENT DOCUMENTS

| | | | |
|---|---|---|---|
| 5,401,905 A * | 3/1995 | Lesser et al. | 174/99 R |
| 5,547,152 A * | 8/1996 | Krock | F16L 3/1008 |
| | | | 24/274 WB |
| 5,556,059 A * | 9/1996 | Maeda et al. | 248/49 |
| 5,725,185 A * | 3/1998 | Auclair | 248/74.2 |
| 6,084,180 A * | 7/2000 | DeBartolo, Jr. | H02G 3/0418 |
| | | | 174/101 |
| 6,126,123 A | 10/2000 | Yang | |
| 6,206,331 B1 * | 3/2001 | Keith et al. | 248/74.1 |
| 6,216,746 B1 * | 4/2001 | Guebre-Tsadik et al. | 138/155 |
| 6,234,429 B1 * | 5/2001 | Yang | 248/74.1 |
| 6,323,421 B1 * | 11/2001 | Pawson | H02G 3/0418 |
| | | | 174/503 |
| 6,513,289 B1 * | 2/2003 | Decore | H02G 3/0406 |
| | | | 16/225 |
| 6,766,093 B2 * | 7/2004 | McGrath | H04Q 1/066 |
| | | | 379/327 |
| D499,699 S * | 12/2004 | Thibault | D13/155 |
| 7,017,615 B2 * | 3/2006 | Suzuki et al. | 138/110 |
| 7,172,162 B2 * | 2/2007 | Mizukoshi | F16L 3/2235 |
| | | | 248/49 |
| D539,228 S * | 3/2007 | Toikka | D13/155 |
| 7,198,423 B2 | 4/2007 | Mathieu et al. | |
| 7,201,352 B2 | 4/2007 | Kawai | |
| 7,770,848 B2 * | 8/2010 | Johnson | F16L 3/1207 |
| | | | 248/65 |
| 7,770,850 B2 * | 8/2010 | Allmann | F16L 3/2235 |
| | | | 248/65 |
| 7,939,759 B2 * | 5/2011 | Henry | H02G 3/0431 |
| | | | 174/101 |
| 7,963,486 B2 * | 6/2011 | Wilson | H04Q 1/062 |
| | | | 174/101 |
| 8,020,812 B2 * | 9/2011 | Matsuno | F16L 3/1075 |
| | | | 24/336 |
| 8,061,627 B2 * | 11/2011 | Norman et al. | 238/10 A |
| 8,157,222 B1 * | 4/2012 | Shirey et al. | 248/74.1 |
| 8,183,471 B2 * | 5/2012 | Handler | H02G 3/0418 |
| | | | 174/480 |
| 8,317,142 B2 * | 11/2012 | Gallardo | B05B 15/061 |
| | | | 239/282 |
| 2001/0052564 A1 * | 12/2001 | Karlinger | B25J 19/0025 |
| | | | 248/74.1 |
| 2004/0154822 A1 * | 8/2004 | Matsuda et al. | 174/72 A |
| 2005/0022344 A1 | 2/2005 | Igarashi | |
| 2005/0253033 A1 * | 11/2005 | Mizukoshi | F16L 3/2235 |
| | | | 248/229.23 |
| 2005/0284989 A1 | 12/2005 | Mizukoshi | |
| 2007/0249210 A1 | 10/2007 | Ito | |
| 2010/0051346 A1 * | 3/2010 | Sculler et al. | 174/72 A |
| 2011/0315830 A1 | 12/2011 | Eshima et al. | |
| 2013/0068522 A1 * | 3/2013 | Ogawa | B60R 16/0215 |
| | | | 174/72 A |

FOREIGN PATENT DOCUMENTS

| | | | |
|---|---|---|---|
| EP | 0555687 A1 | 8/1993 | |
| EP | 1847746 A1 | 10/2007 | |
| EP | 2128946 A1 | 12/2009 | |
| FR | 2683608 A1 * | 5/1993 | F16L 3/10 |
| FR | 2683608 B1 * | 2/1995 | F16L 3/10 |
| FR | 2811736 A1 | 1/2002 | |
| FR | 2861906 A1 | 5/2005 | |
| JP | 10084613 A | 3/1998 | |
| JP | 2001193895 A | 7/2001 | |
| JP | 2008271672 A | 11/2008 | |
| WO | 2010011508 A1 | 1/2010 | |

* cited by examiner

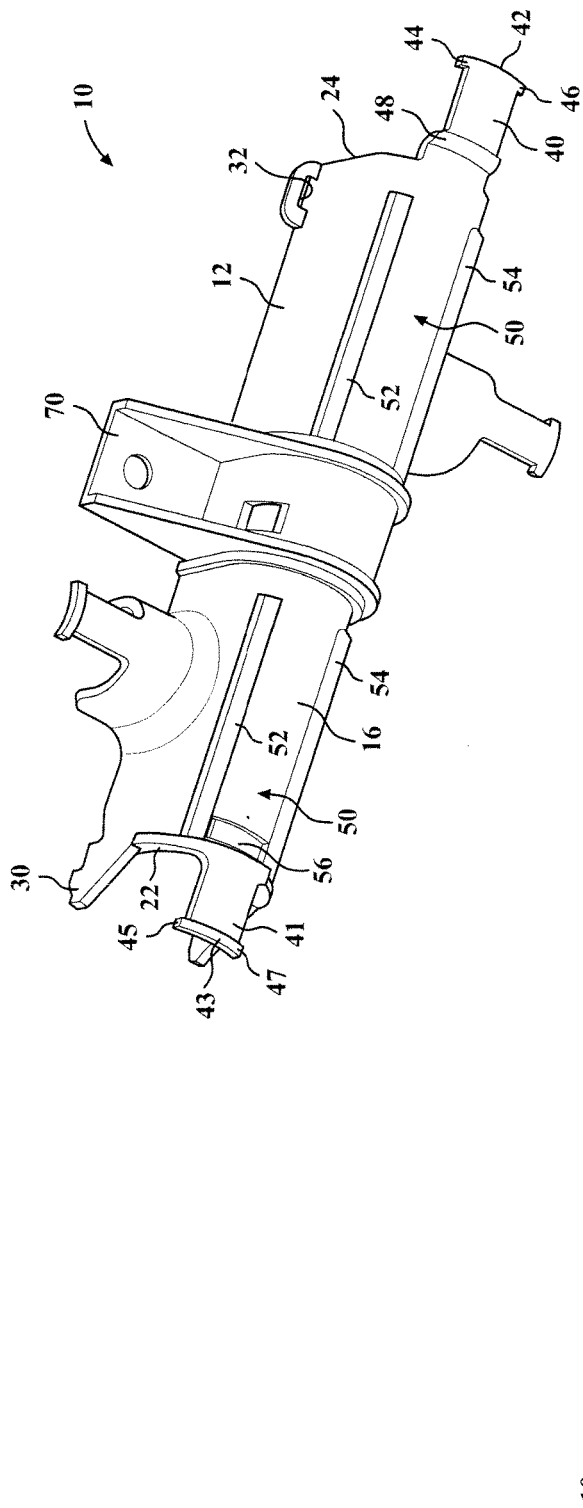
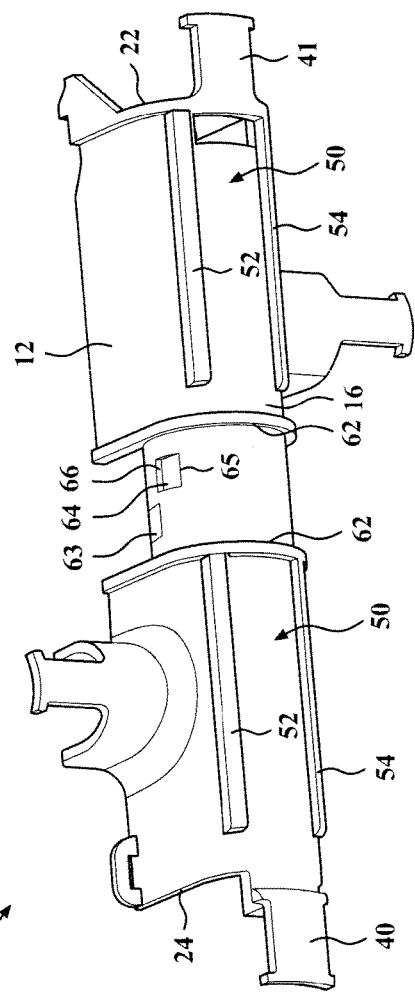
FIG. 2
FIG. 3

WIRE MANAGEMENT SYSTEM

FIELD OF THE INVENTION

The present invention relates generally to a wire management system and, more particularly, to a wire management system including at least one wire track unit, each wire track unit including a rotatable mount for retaining wires and/or cables and mounting the unit to a mounting surface.

BACKGROUND OF THE INVENTION

Wire management systems have been developed for retaining cables or wires, such as electrical wiring harnesses, when the cables need to extend from one location to another location. For example, when a home stereo system is mounted on a shelf and needs to be connected by a cable to an electrical outlet or an electronic device which is located some distance below the stereo system, a wire management system is attached to the wall extending between the two locations for retaining the wire and hiding the wire. Another example includes an electrical wiring harness used in a vehicle to connect, for example, electricity from a power source to an electric-mechanical device such as a window lift mechanism.

In the typical wire management system, features providing for many various needs have not been provided in one standard, off-the-shelf-type, design including, without limitation, features for (i) mounting the system to a surface, vertical and/or horizontal, (ii) holding the wires in the track with a sufficient amount of force to reduce movement, and (iii) assembling each track unit together with another track unit in a quality manner.

In addition, although in some known wire management systems certain of the foregoing features have been provided individually, it is not known to provide features in combination to ensure the simultaneous actions of such features. For example, although it has been known to provide for some type of mounting feature to mount the wire system to a surface, it has not been known to provide a feature which simultaneously holds the wires in the track while also providing for a mounting feature.

Therefore, there exists a need for a wire management system having track units that can be easily attached with one another and configured to obtain a desired longitudinal length. In addition, there exists a need for simultaneously holding the wires in the track units while also providing for a mounting feature for mounting the system, and each track unit, to a surface.

SUMMARY OF THE INVENTION

A wire management system including a wire track unit having a generally u-shape extending along a longitudinal axis. The wire track unit includes a wire surface, a back surface and parallel side walls extending from the wire surface. The side walls generally run parallel to the longitudinal axis with each side wall having a first end and a second end spaced from one another a distance extending along said longitudinal axis. The first end of each of the side walls includes a male feature. The second end of each of the said side walls includes a female feature for receiving the male feature. The wire track unit includes a tension tab formed on one of the side walls of the wire track unit. The wire track unit further includes a mount rotatably positioned on the back surface of the wire track unit along an axis perpendicular to the longitudinal axis and in alignment with the tension tab.

BRIEF DESCRIPTION OF THE DRAWINGS

Exemplary embodiments of the invention will now be described in conjunction with the following drawings, in which:

FIG. 2 is a perspective bottom view of a wire track unit including a mount in the unmounted position without wire installed in such unit.

FIG. 3 is a perspective bottom view of a wire track unit without having a mount assembled thereon.

DETAILED DESCRIPTION

Figure 1:
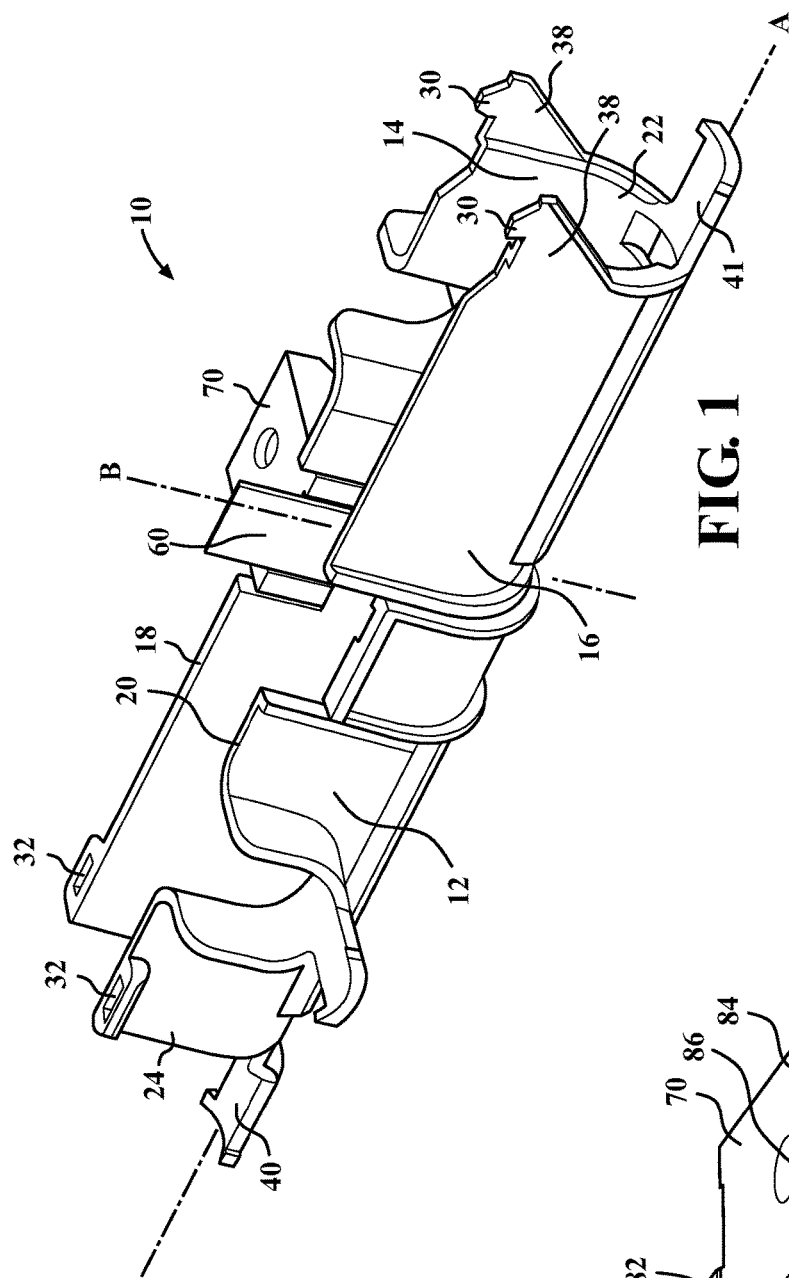
FIG. 1 is a perspective top view of a wire track unit including a mount in the unmounted position without wire installed in such unit.

FIG. 1 illustrates in general an exemplary wire management system 10 for managing wires or cables in accordance with an aspect of the present invention. More specifically, the wire management system 10 is shown in FIG. 1 in the manufactured and/or shipped position and does not show the use of the wire management system with a wire positioned therein and/or as mounted to a mounting surface including, for example, a door panel. The system 10 includes at least one wire track unit 12 generally formed in a u-shaped manner about a longitudinal axis A. The wire track unit 12 may be used by itself for the management of wires or along with more than one wire track unit 12 to form an assembly of wire track units. Each wire track unit 12 may be either straight, curved in a plane parallel to axis A or bent in a plane perpendicular to axis A, as more fully shown below.

Each wire track unit 12 includes a wire surface 14, a back surface 16 and parallel side walls 18, 20 extending from the wire surface 14. The side walls 18, 20 generally run parallel to the longitudinal axis A with each side wall 18, 20 having a first end 22 and a second end 24 spaced from one another a distance extending along axis A equal to the longitudinal length of each wire unit 12. Further, the width of each wire unit 12 extends perpendicular to axis A and between each side wall 18, 20.

Referring to FIGS. 1-2, each first end 22 of each side wall 18, 20 includes a male feature 30 and each second end 24 of each side 18, 20 includes a female feature 32. In use when assembling more than one wire track 12, the first end 22 of one wire track unit 12 is mated with the second end 24 of a second wire track unit 12 to form a wire management system 10 having more than one wire track unit 12 connected along axis A. The male feature 30 extends in a plane parallel with its associated side 18, 20 and the female feature 32 is formed as a hole in a surface which is perpendicular to each side 18, 20 to receive such male feature 30. In addition, the male feature 30 is formed on an extension surface 38 which is formed on each first end 22 in a manner extending parallel with axis A and the associated side 18, 20 in an extending manner away from its associated wire track unit 12. In other words, the extension surface 38 extends parallel with axis A toward the next wire track unit 12 to be attached to the wire track unit 12.

Further, each second end 24 of each side wall 18, 20 is formed to permit the second end 24 to deflect inward toward axis A during assembly of one wire track unit 12 with another wire track unit 12. More specifically, during such assembly of one wire track unit 12 with another wire track unit 12, the second end 24 is deflected inward toward axis A and the male feature 30 is inserted into the female feature 32. Since the extension surface 38 extends toward the second wire unit 12 being assembled to the first wire unit 12, the second end 24 of the first wire unit 12 is retained at least partially inside of the extension surface 38 when assembled.

Each wire track unit 12 includes a joinder tang 40 extending outwardly from the second end 24 of the wire track unit 12 along axis A and formed approximately at the bottom of the u-shaped wire unit 12 between each side wall 18, 20. As best shown in FIGS. 1 and 2, the joinder tang 40 extends a pre-determined amount from the wire track unit 12 to form a contact end 42 having a greater width than the majority of the width of the joinder tang 40. Further, each joinder tang 40 is slightly offset from the back surface 16 with use of a radius 48. The amount of such offset is approximately equal to the material thickness of the wire track unit 12 so that after assembly of one wire track unit 12 to another wire track unit 12, the wire surfaces 14 of each unit can be approximately planar without upset. Each contact end 42 includes at least two tabs 44, 46 for assisting with the alignment of each wire track unit 12 when assembled to another wire track unit 12, as discussed further below.

As best shown in FIG. 2, the joinder tang 40 is positioned in a joinder slot, generally shown at 50, formed on the back surface 16 of each wire track unit 12. The joinder slot 50 is formed integrally with the wire track unit 12 with the use of two rail-like formations 52, 54 extending parallel with axis A. Rail-like formations 52, 54 extend from the back surface 16 a predetermined distance in a plane perpendicular to axis A. When assembling one wire track unit 12 to another, as discussed further below, the two alignment tabs 46, 48 use an associated rail 52, 54 to guide and/or assist in the effective alignment along axis A of one wire unit 12 to another wire unit 12.

Further, as best shown in FIG. 2, each wire track unit 12 includes an aperture 56 formed between the wire surface 14 and the back surface 16 on the first end 22 for receiving the joinder tang 40 during assembly, as described in more detail below.

Further, with reference to FIGS. 1 and 2, each wire track unit 12 includes a tape tab 41 extending from the first end 22 of the wire track unit 12 along axis A and formed approximately at the bottom of the u-shaped wire unit 12 between each side wall 18, 20. The tape tab 41 extends a pre-determined amount from the wire track unit 12 to form an end 43 having a greater width than the majority of the width of the tape tab 41. At least two tape tabs 45, 47 are formed at the end 43 for assisting with the assembly of the wire or cables to the wire track unit 12, as discussed further below. In addition, each tape tab 41, depending on the use during assembly with other wire track units, may also be used in a manner similar to the joinder tang in that the tape tab may align with rail-like projections on the back surface 16 of a mating wire track unit.

With reference to FIG. 1, the wire track unit 12 further includes a tension tab 60 integrally formed on one side wall 18, 20 of the wire track unit 12. In the unassembled position, i.e., in the shipped position before a wire or cable is inserted into the wire track unit 12, the tension tab 60 extends in a plane parallel with side walls 18, 20 and, after assembly with a wire or cable, in a plane approximately perpendicular to the side walls 18, 20. After assembly, and as more fully described below, the tension tab 60 is deflected to a position extending from one side wall 18, 20 to the opposite side wall 18, 20, depending on which side the tension tab 60 is integrally formed on as part of the wire track unit.

FIGS. 1-2 show a mount 70 rotatably positioned for sliding engagement on the back surface 16 of each wire track unit 12—in the unassembled state without use with a wire or cable. The mount 70 is provided for mounting the wire track unit 12 to a mounting surface (not shown) while also simultaneously holding/covering the wires and/or cables in the wire track unit 12 on the wire surface 14 in a positive and firm manner along with the combined use of the tension tab 60. More specifically, and as more fully described below, after the wire track unit 12 receives the wires and/or cables on the wire surface 14, the assembler rotates the mount 70 approximately one hundred and eighty degrees about axis A in a sliding manner on back surface 16 while also deflecting the tension tab 60, approximately ninety degrees about the side wall 18, 20 it is integrally formed on, to thereby firmly hold the wire and/or cables against the wire surface 14.

The mount 70 is moveably retained on the wire track unit 12 in the unassembled, i.e., prior to rotation, position with use of one way teeth formed on the mount 70 and on the wire track unit 12. Similarly, and as more fully described below, the mount 70 is moveably retained on the wire track unit 12 in the assembled, i.e., after rotation, position with use of one way teeth formed on the mount 70 and on the wire track unit 12. Also, with respect to lateral alignment, the mount 70 is aligned with the tension tab 60 along a plane perpendicular to axis A, as denoted by dashed line B, and retained along such plane with the use of a pair of circumferentially formed ribs 62 integrally formed on the back surface 16 of the wire track unit 12, as described below. Such ribs 62 are formed a pre-determined amount apart equal to a width of the mount 70.

FIG. 3 shows the wire track unit 12 having the ribs 62 integrally formed on the back surface 16 and spaced a certain amount approximately equal to the width of the mount 70 (not shown). In addition, FIG. 3 shows two one way teeth 63 and 64 formed on the back 16 of the wire track unit 12 for mating engagement with similarly profiled one way teeth formed on an inner surface of the mount 70. Each of such one way teeth 63 and 64 include a ramp portion 65 and a detent portion 66 formed in each tooth 63, 64. The ramp portion 65 permits sliding rotational movement of the mount 70 about the back surface 16 and the detent portion 66 is formed to prevent movement of the mount 70 about the back surface 16, as more fully described below.

Figure 4:
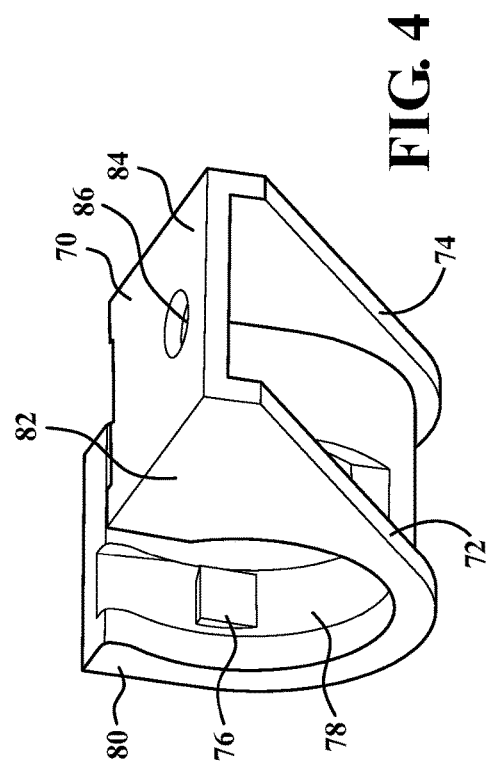
FIG. 4 is a perspective view of a mount unassembled onto the wire track unit.

Referring to FIG. 4, the mount 70 is formed separate of the wire track unit 12 and assembled to the wire track unit 12 in an unassembled rotatable position on the back surface 16 and between the circumferentially formed ribs 62. The mount 70 includes two edges 72, 74 spaced a distance along axis A to form a width of the mount 70. The mount 70 includes a pair of teeth 76 integrally formed on an inner surface 78 of the mount 70 for use in connection with positioning and holding the mount 70 on the wire track unit 12 in the unassembled rotatable position while also preventing rotation from the assembled position to the unassembled position after assembly and mounting of the wire track unit 12 to a surface, as more fully described below. More specifically, the teeth 76 (FIG. 4 only shows one of two teeth) are formed as one-way type teeth for mating with similarly profiled teeth 63, 64 formed on the back surface 16 of the wire track unit 12. Similarly as provided for teeth 63, 64, the one way teeth on the mount 70 are provided with a ramp portion and a detent portion permitting sliding movement of the mount 70 on the back surface 16 in one direction and preventing the mount 70 from falling from the back surface 16 in another direction. It should be appreciated that any number of teeth having profiling surfaces for mating between the mount 70 and the wire track unit 12 may be employed provided the mount 70 is permitted to slideably rotated about the back surface to cover the wires and/or cables in the assembled position and preventing the mount 70 from falling loose from the wire track unit 12 during the shipped, i.e., unmounted, position.

In addition, also as shown in FIG. 4, the mount 70 further includes two sides 80, 82 spaced circumferentially a predetermined amount to form the u-shape portion of the mount 70. One of such sides 80, 82 is provided with a mounting flange 84 aligned in a plane parallel with the mounting surface. The flange 84 includes, in this example, a bore 86 provided for receiving a fastener for fastening the flange 84 to the mounting surface after such mount 70 is rotatably moved from the unassembled position approximately one hundred and eighty degrees to the assembled position. It should be appreciated that any known type of fasteners (not shown) may be used including, for example, one way panel fasteners, self-tapping screws, or bolts. More specifically, the fastener could also be provided on the mount 70 in the shipped position and/or the fastener could be at least partially molded integral with the mount 70 including, for example, a one-way panel fastener molded on at least partially with the mount 70.

Figure 6:
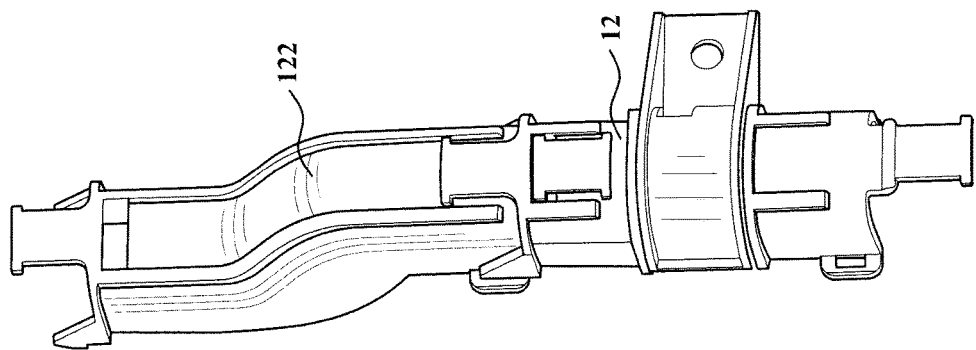
FIG. 6 is a perspective bottom view of two wire track units including one bent unit without wire installed in such units.
Figure 5:
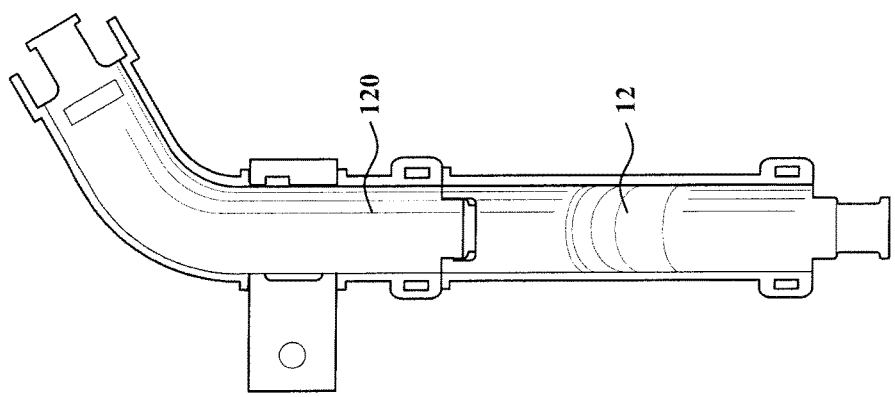
FIG. 5 is a perspective bottom view of a two wire track units including one curved unit without wire installed in such units.
Figure 7:
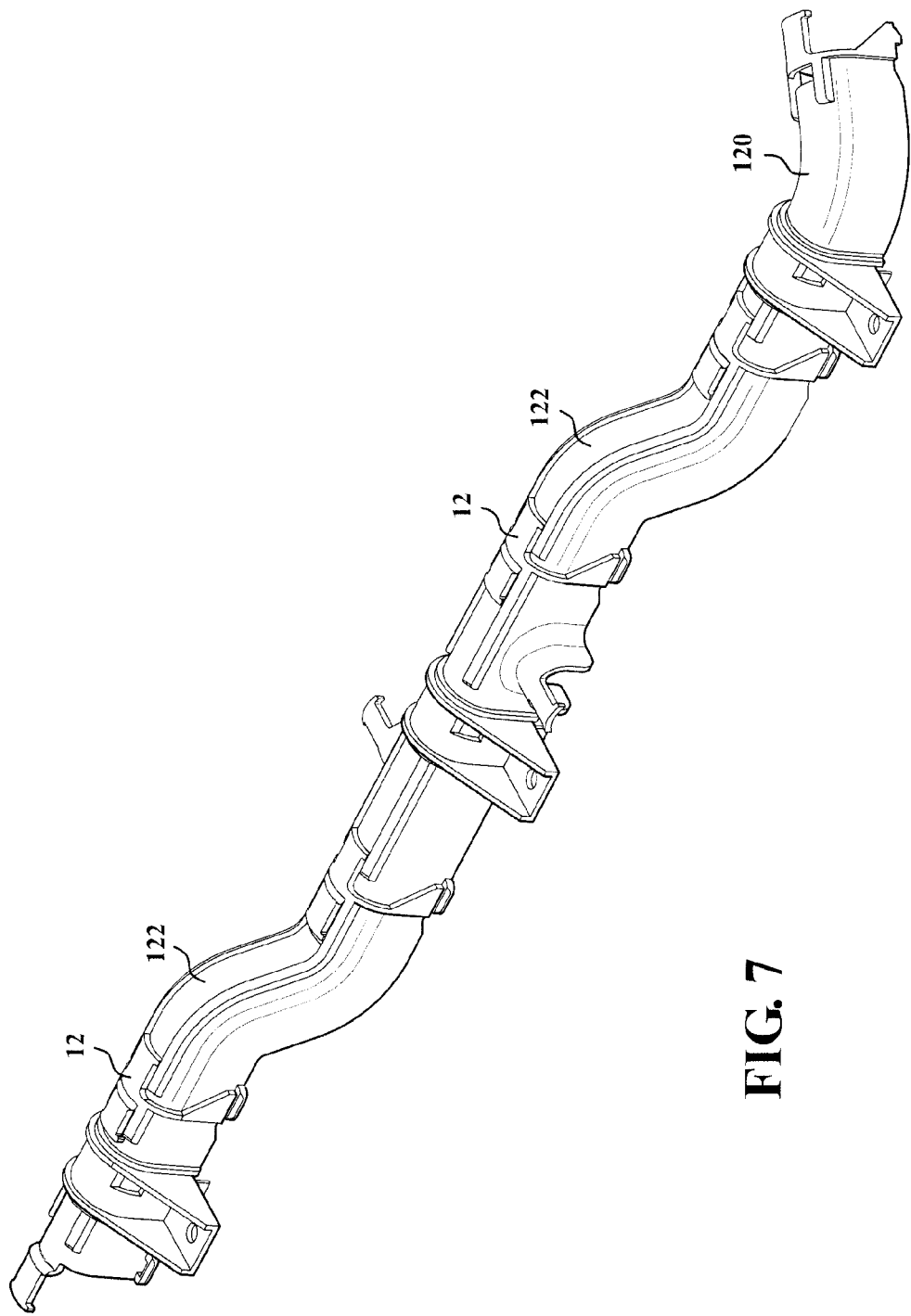
FIG. 7 is a perspective bottom view of five wire track units including two straight units, two bent units and one curved unit without wire installed in such units.

As discussed above, although the example of the wire track unit 12 shown in FIGS. 1-3 is a straight wire track unit 12 without any curve or bend. It should be appreciated that each wire track unit 12 may be straight, curved, or bent. FIG. 5 shows two wire track units 12 and 120 assembled together wherein unit 120 is curved in a plane parallel to axis A. FIG. 6 shows two wire track units 12 and 122 assembled together wherein unit 122 is bent in a plane perpendicular to axis A. Further, FIG. 7 shows an assembly of five wire track units including two straight units 12, two bent units 122 and one curved unit 120.

Figure 8:
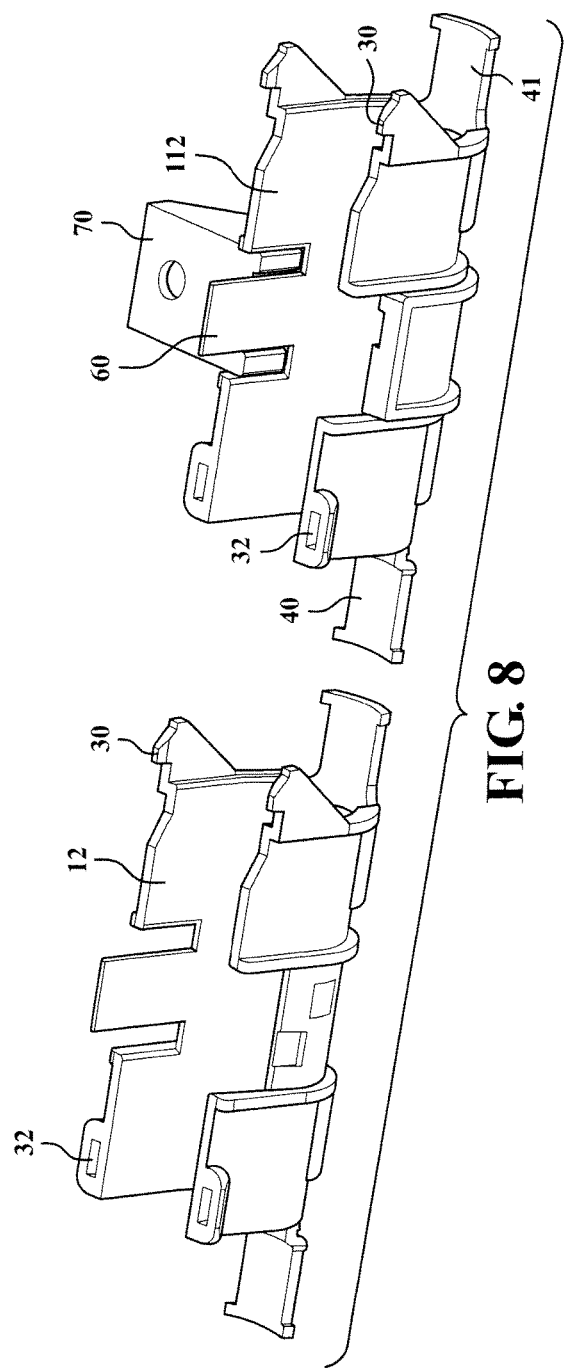
FIG. 8 is a perspective top view of two wire track units positioned for attachment to one another wherein one of the two wire track units includes a mount.

FIG. 8 shows two wire track units 12 and 112 positioned to be assembled together in alignment. In this FIG. 8, wire track unit 12 does not include a mount 70 and wire track unit 112 does include the mount 70 in the shipped—unrotated, unmounted—position.

Figure 9:
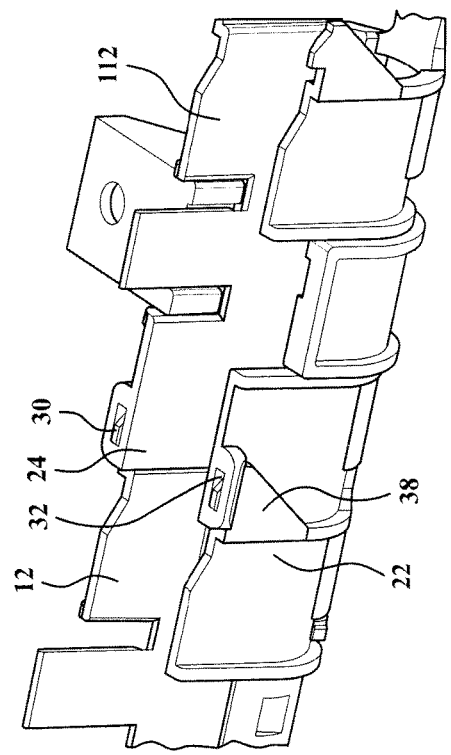
FIG. 9 is a perspective top view of the two wire track units from FIG. 8 assembled together.

FIG. 9 show two wires track units 12 and 112 assembled together wherein male portion 30 is received in female portion 32 and the second end 24 of wire track unit 112 is at least partially positioned inside of first end 22 and extension surface 38 of wire track unit 12.

Figure 10:
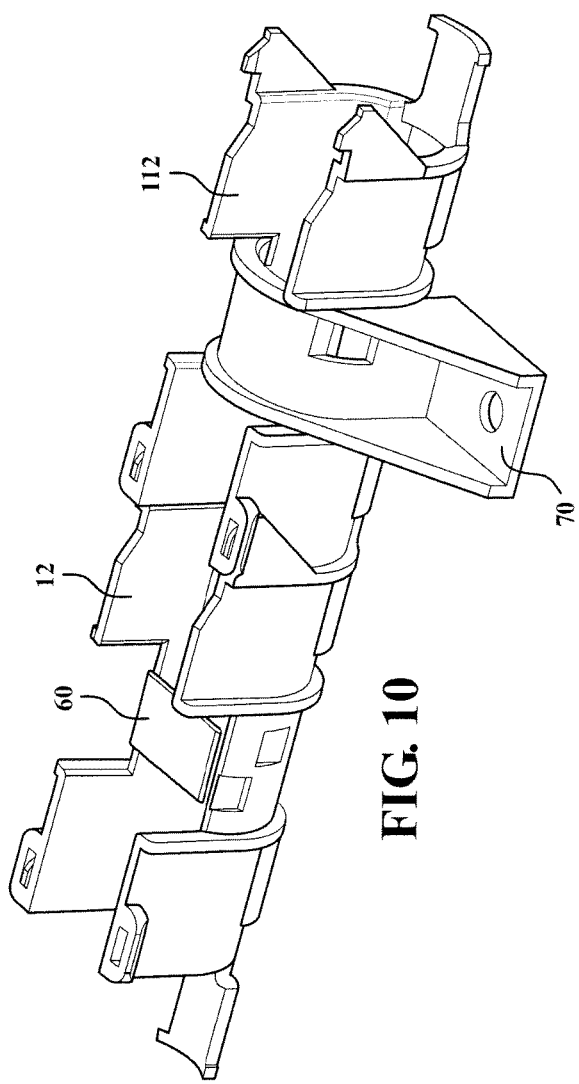
FIG. 10 is a perspective top view of the two wire track units from FIG. 9 assembled together with the mount rotated to an assembly/mount ready position.

FIG. 10 shows the two wire track units 12 and 112 of FIG. 9 wherein the mount 70 is rotated to an assembly/mounting ready position for mounting to a mount surface (not shown). The mount 70 is slideably rotated approximately one hundred and eighty degrees about the back surface 16 from any open position for receiving the wires and/or cables (not shown) to an assembly/mounting ready position. The mount 70 is shown locked into such assembly/mounting ready position with the use of one way teeth and the tension tab 60 on wire unit 112 and 12 is shown deflected approximately ninety degrees. In this FIG. 10, the tension tab 60 on wire track unit 12 is shown deflected approximately ninety degrees without the mount 70 mounted thereon. It should be appreciated that each wire track unit may be used with or without a mount 70 and that each tension tab 60 wherein the mount 70 is not used could simply be deflected by the assembler to also provide some retention of the wires and/or cables in the wire track unit 12. For purposes of showing how the tension tab 60 is deflected and to what extent, this FIG. 10 is provided without a mount 70 mounted on wire track unit 12.

Figure 11:
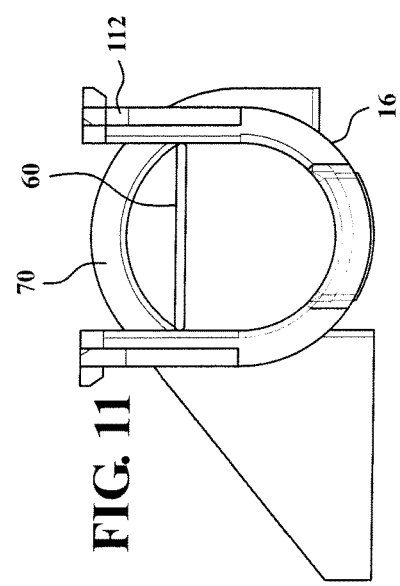
FIG. 11 is an end view of the wire track assembly shown in FIG. 10 with the mount rotated to an assembly/mount ready position.

FIG. 11 is an end view of the wire track unit 112 shown in FIG. 10 showing the mount 70 and the tension tab 60 positioned to retain and/or cover a wire and/or cable (not shown) in the wire track unit.

Figure 12:
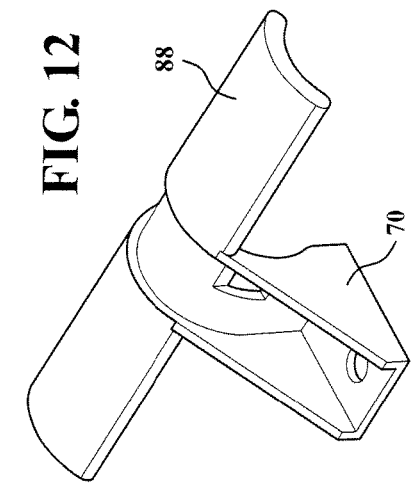
FIG. 12 is another example of a mount 70.

FIG. 12 is another example of the mount 70 having a retention surface 88 including a width greater than the width of the tension tab 60. In some cases, it might be desirable to have the mount 70 including a wider surface area ultimately covering the wires and/or cables after the mount 70 is rotated to the assembly/mount ready position. FIG. 12 shows such an example providing for a mount 70 with a wider retention surface 88.

Figure 13:
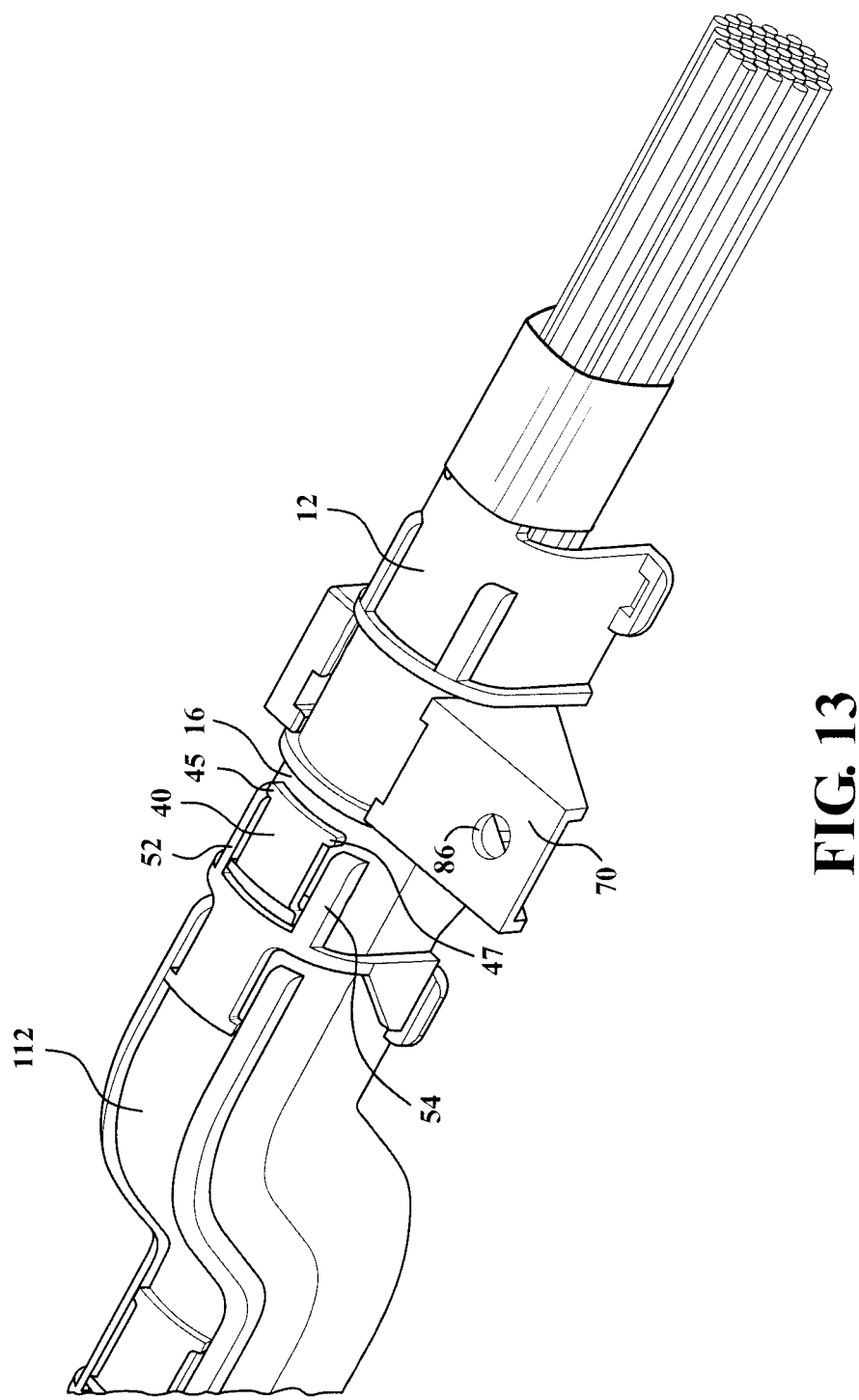
FIG. 13 is a perspective bottom view of two wire track units assembled together with a wire and/or cable assembled in the wire track units and retained and/or covered by the mount.

In use, as shown in FIG. 13, the wire track unit 12 is formed of certain composite materials and the mount 70 is rotatably mounted to the wire track unit 12 in the unassembled position when shipped to the customer. After receipt of the wire track unit 12 by the customer, an assembler may elect to assemble more than one wire track unit 12 to another wire track unit 122, in this example, to form an assembly of such units having a certain length and/or curvature. After election of the use of one or more track units, the assembler positions each of the wire track units to be assembled together proximate each other, similar to FIG. 8.

During assembly of one wire track unit 12 to another track unit 112, the joinder tang 40 of wire track unit 112 is inserted down and through the aperture 56 of wire track unit 12 simultaneously with the second end of wire track unit 112 deflecting inward toward axis A to permit male portions of wire track unit 12 to be inserted into female portions 32 of wire track unit 112. In addition, tabs 45, 47 of the joinder tang 40 of wire track unit 112 are guided along the rail-like formations 52, 54 formed on the back surface 16 of wire track unit 12 to provide alignment of each unit along axis A. Further, after complete insertion/mating of wire track unit 112 to unit 12, tabs 45, 47 are also used to at least partial retain each unit together, as shown in FIG. 13.

After assemble of one wire track unit to another, again with reference to FIG. 13, the assembler presents the wire and/or cable into and against the wire surface 14. After positioning the wire against the wire surface 14, the assembler rotates the mount 70 one hundred and eighty degrees from the unassembled position to the assembled position while also deflecting the tension tab 60 ninety degrees as firmly against the wires and/or cables. After aligning the bore 86 with an associated bore or aperture on the mounting surface, the assembler inserts a fastener through the bore 86 and into the mounting bore aperture. In addition, in this example, the joinder tang 40 of wire track unit 12 is shown with use of tape wrapped around the wire and/or cables and the joinder tang 40 after insertion and assembly of wires and/or cables into the wire track unit. The tabs 45, 47 on the joinder tangs and on the tape tab 41 may also be used to help retain the tape wrapped around the wire track unit in that each tab offers some additional retention against axial movement.

It should be appreciated that when the mount 70 is in the assembled position the mount 70 has been rotated approximately one hundred and eighty degrees about the u-shaped wire track unit 12 and as such, is enclosing at least a portion of an open area of the u-shaped wire track unit 12, i.e., above or spaced from the wire surface 14 and not the back surface 16. As such, the mount 70 is used to mount the wire track unit 12 to the mounting surface while also deflecting the tension tab 60 ninety degrees which holds the wires firmly against the wire surface 14—in a closed manner of the u-shaped wire track unit. It should be appreciated that since the mount 70 provides some "closure" function of the open area of the u-shaped wire track unit 12, the mount 70 may be formed with various shapes, again as shown in FIG. 12, which provide more of such "closure" function.

It will be obvious to those skilled in the art that various other changes and modifications may be made without departing from the scope of the invention and the invention is not to be considered limited to what is shown in the drawings and described in the specification.

What is claimed is:

1. A wire management system comprising:
    at least one wire track unit extending along a longitudinal axis;
    said wire track unit having a U-shaped wall that has an interior surface which defines a wire cavity and has an exterior surface that generally follows said interior surface;
    said U-shaped wall of said wire track unit having wall ends that are spaced from one another by an opening for receiving at least one wire into said wire cavity;
    said U-shaped wall extending along said longitudinal axis from a first end to a second end;
    said first end of said U-shaped wall including a male feature;
    said second end of said U-shaped wall including a female feature capable of receiving a male feature of another wire track unit;
    said wire track unit including a tension tab integrally formed with said U-shaped wall;
    a mount made as a separate piece from said wire track unit;
    said mount having a flange and a U-shaped portion;
    said flange of said mount presenting a bore that is shaped to receive a fastener for fastening said mount with a mounting surface;
    said U-shaped portion of said mount having spaced apart sides and presenting an inner surface;
    said mount being attached with said wire track unit and being moveable relative to said wire track unit from an unassembled position to an assembled position;
    said U-shaped portion of said mount including at least one tooth formed on at least one of said sides, said at least one tooth being engageable with said exterior surface of said U-shaped wall of said wire track unit to restrict unintentional movement of said mount from said unassembled position to said assembled position;
    in said unassembled position, said inner surface of said mount being in direct contact with exterior surface of said U-shaped wall for allowing insertion of at least one wire into said wire cavity; and
    in said assembled position, said U-shaped portion of said mount extending across said opening between said wall ends of said wire track unit to trap at least one wire in said wire cavity.

2. The system of claim 1 wherein said tension tab is deflected by said mount during sliding rotation of said mount on said exterior surface of said wire track unit.

3. The system of claim 2 wherein said tension tab is deflected to extend across said opening from one wall end to the other wall end.

4. The system of claim 1 wherein said wire track unit includes a joinder tang extending outwardly from the wire track unit along said longitudinal axis.

5. The system of claim 4 wherein said joinder tang includes at least two alignment tabs.

6. The system of claim 1 wherein said male feature is formed on an extension surface on said first end in a manner extending parallel with said longitudinal axis.

7. The system of claim 1 wherein said U-shaped wall presents a pair of ribs that are spaced from one another in a longitudinal direction to present a channel, wherein said mount engages said U-shaped wall in said channel between said spaced apart ribs, and wherein said U-shaped wall of said wire track unit has approximately the same width in said channel and on opposite longitudinal sides of said ribs from said channel.

* * * * *